(12) United States Patent  
Cormode et al.

(10) Patent No.: US 8,799,754 B2  
(45) Date of Patent: Aug. 5, 2014

(54) VERIFICATION OF DATA STREAM COMPUTATIONS USING THIRD-PARTY-SUPPLIED ANNOTATIONS

(75) Inventors: Graham Robert Cormode, Morristown, NJ (US); Amit Chakrabarti, Hanover, NH (US); Andrew McGregor, Amherst, MA (US)

(73) Assignees: AT&T Intellectual Property I, L.P., Atlanta, GA (US); Trustees of Dartmouth College, Hanover, NH (US)

( * ) Notice: Subject to any disclaimer, the term of this patent is extended or adjusted under 35 U.S.C. 154(b) by 603 days.

(21) Appl. No.: 12/632,345

(22) Filed: Dec. 7, 2009

(65) Prior Publication Data

US 2011/0138264 A1 Jun. 9, 2011

(51) Int. Cl.  
*G06F 11/00* (2006.01)

(52) U.S. Cl.  
USPC .......................................... 714/820

(58) Field of Classification Search  
USPC .......................................... 714/820  
See application file for complete search history.

(56) References Cited

U.S. PATENT DOCUMENTS

| | | | |
|---|---|---|---|
| 5,928,372 A * | 7/1999 | Yoshida | 714/704 |
| 7,039,808 B1 * | 5/2006 | Fausse | 713/170 |
| 7,249,136 B1 | 7/2007 | Muthukrishnan et al. | |
| 7,305,557 B2 | 12/2007 | Albornoz et al. | |
| 7,424,611 B2 * | 9/2008 | Hino et al. | 713/167 |
| 7,590,657 B1 | 9/2009 | Cormode et al. | |
| 7,669,117 B2 * | 2/2010 | Albornoz et al. | 715/230 |
| 7,689,578 B2 * | 3/2010 | Albornoz et al. | 715/230 |
| 8,112,802 B2 * | 2/2012 | Hadjieleftheriou et al. | 726/22 |
| 8,132,005 B2 * | 3/2012 | Tarkkala et al. | 713/168 |
| 2004/0111668 A1 * | 6/2004 | Cragun et al. | 715/512 |
| 2005/0160355 A1 * | 7/2005 | Cragun et al. | 715/512 |
| 2005/0165852 A1 | 7/2005 | Albornoz et al. | |
| 2007/0011453 A1 * | 1/2007 | Tarkkala et al. | 713/168 |
| 2007/0100854 A1 * | 5/2007 | Lain et al. | 707/100 |
| 2007/0174612 A1 * | 7/2007 | Urban et al. | 713/168 |
| 2007/0244891 A1 | 10/2007 | Gopalan et al. | |
| 2007/0262852 A1 * | 11/2007 | Yamamura et al. | 340/10.51 |
| 2007/0280381 A1 | 12/2007 | Amini et al. | |
| 2009/0037459 A1 | 2/2009 | Theobald | |
| 2009/0083418 A1 | 3/2009 | Krishnamurthy et al. | |
| 2009/0327855 A1 * | 12/2009 | Le | 715/230 |
| 2010/0251106 A1 * | 9/2010 | Barrus et al. | 715/268 |

FOREIGN PATENT DOCUMENTS

WO WO 2006130840 12/2006

* cited by examiner

*Primary Examiner* — Bryce Bonzo  
*Assistant Examiner* — Elmira Mehrmanesh  
(74) *Attorney, Agent, or Firm* — Scott P. Zimmerman, PLLC

(57) ABSTRACT

A third party that performs data stream computation is requested to return not only the solution to the computation, but also "annotations" to the original data stream. The annotations are then used by the data owner (in actuality, a "verifier" associated with the data owner) to check the results of the third party's computations. As implemented, the verifier combines the annotations with the original data, performs some computations, and is then assured of the correctness of the provided solution. The cost of verification is significantly lower to the data owner than the cost of fully processing the data "in house".

18 Claims, 1 Drawing Sheet

VERIFICATION OF DATA STREAM COMPUTATIONS USING THIRD-PARTY-SUPPLIED ANNOTATIONS

TECHNICAL FIELD

The present invention relates to a methodology for verifying a third party's computations associated with large data streams and, more particularly, to the use of annotations by a third party in a manner where a "verifier" of the data owner can review both the computation's solution and annotations to be assured of the correctness of the results.

BACKGROUND OF THE INVENTION

The data stream model has become a popular abstraction when designing algorithms that process massive data sets (for example, communication network traffic). The computational restrictions that define the data stream model are severe; algorithms must use a relatively small amount of working memory and process input in whatever order it arrives. This captures constraints in high-throughput data processing settings. For example, network monitoring often requires real-time (or near-real-time) response to anomalies. Thus, traffic data needs to be processed as soon as it arrives, rather than be stored and processed offline at a later time. For massive data sets stored in external memory, being able to process the data in any order avoids the I/O bottlenecks that arise with algorithms that assume random access. Unfortunately, while some problems admit efficient streaming algorithms, many others require a relatively large working memory—or multiple passes over the data—both of which are not feasible in most situations.

When dealing with massive quantities of data, a data owner would often like to "outsource" the operations associated with processing the data to generate computational solutions. For example, the data might consist of two very large database relations, and the desired computation consists of performing a "join" operation between the two. Computing this join can be costly, so it is desirable to engage a more powerful third party to perform this task. However, the data owner would also like to be assured that the result is correct.

In another environment, there are instances where a large number of co-processors or multiple cores are being used directly by a data owner to process large quantities of data. Malfunctions of the hardware, software, or a combination of both, may lead to situations where a data owner cannot trust the reliability of the data computation.

A need exists, therefore, for a system of providing assurance to a data owner that data stream computations have been properly performed and have generated accurate results.

SUMMARY OF THE INVENTION

The needs remaining in the prior art are addressed by the present invention, which relates to a methodology for verifying a third party's computations associated with large data streams and, more particularly, to the use of annotations by a third party in a manner where a "verifier" of the data owner can review both the computation's solution and annotations to be assured of the correctness of the results.

In accordance with the present invention, a third party that performs data stream computation is requested to return not only the solution to the computation, but also "annotations" to the original data stream. The annotations are then used by the data owner (in actuality, a "verifier" associated with the data owner) to check the results of the third party's computations. As implemented, the verifier combines the annotations with the original data, performs some computations, and is then assured of the correctness of the provided solution. The cost of verification is significantly lower to the data owner than the cost of fully processing the data "in house". The verification may be performed on a general-purpose computer suitable for use in performing the functions described in detail hereinbelow.

An advantage of the present invention is found in that the annotations can be sublinear in the input size and thus further reduce the space usage of the data stream algorithms.

Other and further aspects and advantages of the present invention will become apparent during the course of the following discussion and by reference to the accompanying drawings.

BRIEF DESCRIPTION OF THE DRAWINGS

The teachings of the present invention can be readily understood by considering the following detailed description in conjunction with the accompanying drawings, in which.

DETAILED DESCRIPTION

Massive data streams often require a third party to engage in processing the large quantities of data on behalf of the data owner. However, as noted above, the data owner would like to be assured of the correctness of the results of the various types of processing that may be performed by such third parties. The present invention addresses the feasibility of off-loading data stream computation to a third-party (hereinafter referred to as a "helper") so that single pass, small-space stream computation is possible even for various "hard" computational functions.

A fundamental question, therefore, is how to be sure that the helper is being honest. In accordance with the present invention, the helper is instructed to annotate the data stream as it is being read. The annotated data stream, along with the processing results, are then supplied to and reviewed by the data owner (hereinafter referred to as the "verifier") to determine if the helper has correctly computed the answer. There must be assurance that the verifier has a very low probability of being fooled. As will be discussed below, the premises of the present invention are related to concepts from Theoretical Computer Science, such as Interactive Proofs, Communication Complexity and the so-called "Arthur-Merlin model" (and Algebrization), with additional streaming constraints.

The annotation protocols of the present invention are constructed to have sufficient information contained in the annotation. The protocols achieve a non-trivial tradeoff between the amount of annotation used and the space required to verify the result.

Within this setting, a distinction to keep in mind is whether the advice presented by the helper is "prescient" (that is, the helper's advice is received by the verifier before the stream of information is presented, or "online" (in which case the advice is presented only after the data stream has been observed by the verifier).

Figure 1:
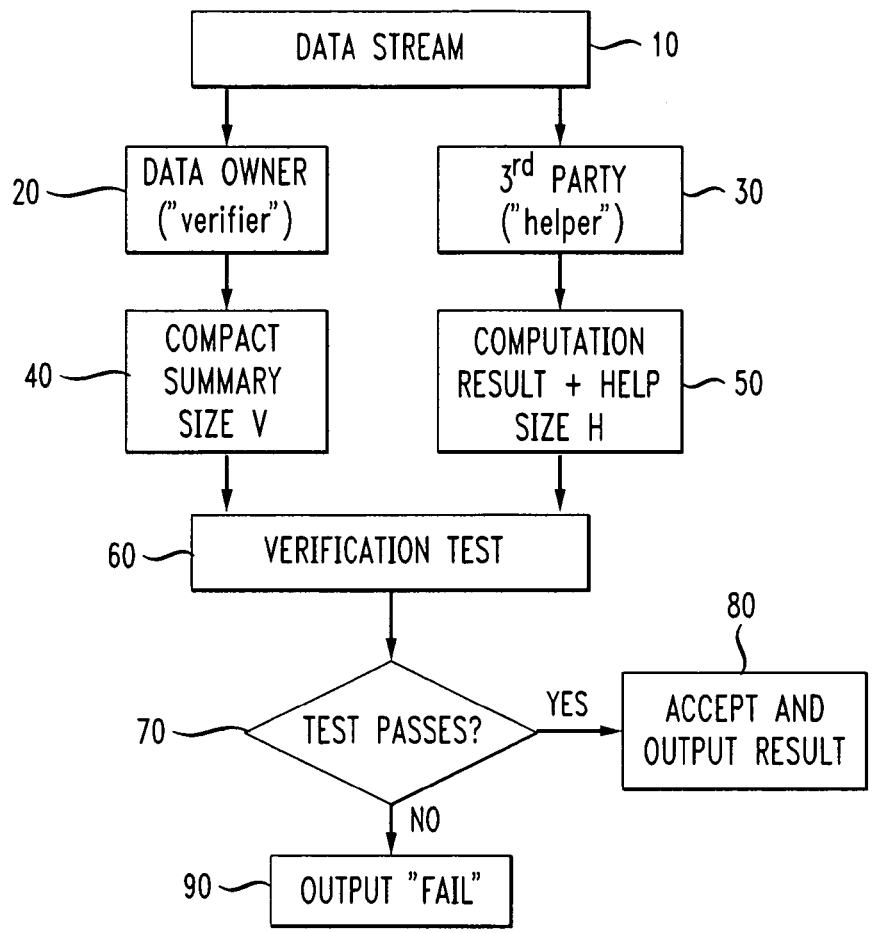
FIG. 1 illustrates an exemplary flowchart illustrating the use of annotations by a third party and verification of the data stream processing by the data owner.

FIG. 1 includes a flowchart illustrating an exemplary system outline associated with the use of annotations to verify third-party processing of data streams. As shown, the original data stream 10 is sent to both a data owner 20 (in particular, to a "verifier" employed by the data owner, and hereinafter referred to as verifier 20) and a third-party/helper 30 (hereinafter referred to as helper 30). Verifier 20 then performs a set of steps 40, described below, using a restricted space (V bits) to perform the analysis. Helper 30 proceeds with the required computation of the data stream, generating both the computation result and an annotated version of the original data stream, as shown in step 50.

Verifier 20 then receives both the computation results and annotated stream from helper 30 in step 60, and compares (step 70) both of these to his summary generated in step 40. If there is an agreement in the comparison performed in step 70, the helper's results are accepted (shown as step 80). Otherwise, the protocol outputs fail (step 90) and the helper's results are not accepted.

There are various models, as described in detail below, that help to prove the upper and lower bounds on the annotation provided by the helper. In the particular case for the one-round stream with annotations model, the following steps are performed:

Define a protocol with a help function "h" over an input length N;

Determine the maximum length of "h" over all inputs, this defines the "help cost" H The verifier is defined as having V bits of memory within which to work The verifier also uses randomness such that the following conditions are satisfied:

For all help strings, $Pr[output \neq f(x)] \leq \delta$, and

There exists a help string so that $Pr[output=f(x)] \geq 1-\delta$

Within this framework, it is possible to study the tradeoff between H and V. That is, when H=0 and V=N, the protocol is trivial. However, achieving H=N and V=polylog N requires a more complex solution.

Figure 2:
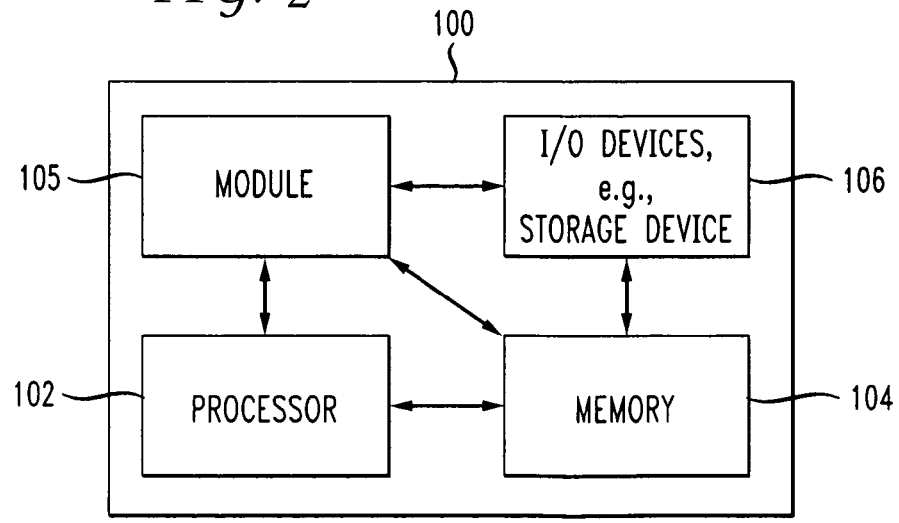
FIG. 2 is a high-level block diagram of a general-purpose computer system useful in implementing the verification process of the present invention.

FIG. 2 depicts a high-level block diagram of a general-purpose computer suitable for use in performing the functions described herein. As depicted in FIG. 2, the system 100 comprises a processor element 102 (e.g., a CPU), a memory 104, e.g., random access memory (RAM) and/or read only memory (ROM), a module 105 for performing a verification test (step 60, FIG. 1) and various input/output devices 106 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)) for communication with, for example, the third-party helper.

It should be noted that the present invention can be implemented in software and/or in a combination of software and hardware, e.g., using application specific integrated circuits (ASIC), a general purpose computer or any other hardware equivalents. In one embodiment, the present module or process 105 for providing computation verification can be loaded into memory 104 and executed by processor 102 to implement the functions as will be described in detail below. As such, the present method 105 for providing computation verification of the present invention can be stored on a computer readable medium, e.g., RAM memory, magnetic or optical drive or diskette and the like.

In general, the present invention is directed to an understanding of what may be referred to (using terms of art from Theoretical Computer section) as "online Merlin-Arthur (MA) communication". The complexity of a range of problems will be described in detail below. In particular, estimating frequency moments has become a canonical problem when exploring variants of the data stream model including, but not limited to, random order streams and read/write streams.

As will be described in detail hereinbelow, the findings of the present invention can be summarized as follows:

Selection: The problem of finding the $k^{th}$ largest of m values in the range [n] highlights the difference between prescient and online annotation. For any h, v such that $hv \geq m$, an $O(v \log m)$-space algorithm is presented that uses $O(h \log m \log n)$ bits of online annotation. Furthermore, this trade-off is optimal up to polylogarithmic factors. In contrast, a trivial $O(\log mn)$ space algorithm can verify $O(\log n)$ bits of prescient annotation.

Frequency Moments and Frequent Items: These computations are concerned with the properties of $\{f_i\}_{i \in [n]}$ where $f_i$ is the frequency of the token "i". For any h, v such that $hv \geq n$, an $O(h \log m)$-space algorithm is presented that uses $(\phi^{-1} v \log m)$ bits of online annotation, and returns exactly the tokens whose frequency exceeds $\phi m$. A second algorithm is presented that requires the verifier to store $O(\log m)$ space and receive $O(\in^{-1} \log^2 m)$ bits of online annotation to return a set of tokens containing $\{i:f_i \geq \phi m\}$ and no elements from $\{i:f_i \leq (\phi - \in) m\}$. This algorithm relies on a powerful way that annotation can be used in conjunction with sketch-based algorithms. Further, for any h, v such that $hv \geq n$, an $O(kv \log m)$-space algorithm is presented that uses $O(k^2 h \log m)$ bits of online annotation and computes $F_k = \Sigma_i f_i^k$ n exactly ($k \in Z_+$). The trade-off is optimal up to polylogarithmic factors, even if the algorithm is permitted to use prescient annotation.

Graph Problems: For graphs defined by streams of m edges on n nodes, it is shown that only $O(\log n)$ space is needed by the verifier to determine whether a graph is connected, contains a perfect matching, or is triangle-free. For any h, v such that $hv \geq n^3$, an $O(v)$ space algorithm is presented for counting triangles that utilizes $O(h)$ bits of annotation, where O is denoted as hiding poly-logarithmic factors.

Let $f:X_1^* \ldots *X_t \rightarrow \{0,1\}$ be a function, where each $X_i$ is a finite set. Such a function $f$ naturally gives a t-player number-in-hand communication problem, where Player i holds an input $x_i \in X_i$ and the players which to output $f(x_1, \ldots, x_t)$ correctly, with high probability. It follows, therefore, that for MA communication a variant of this communication model must be considered. An MA protocol for $f$ is one that involves the usual t players, plus a "super-player", called "Merlin", who knows the entire input $x=(x_1, \ldots, x_t)$. The protocol works as follows: first, Merlin deterministically writes a help message h on the blackboard, and then Players 1 through t run a randomized protocol P, using a public random string R, eventually outputting bit out(P; x, R, h). An MA protocol is $\delta$-error if there exists a function $h:X_1^* \ldots *X_t \rightarrow \{0,1\}^*$, such that:

1. If $f(x)=1$, then $Pr_R[out(P; x, R, h(x))=0] \leq \delta$, and

2. If $f(x)=0$, then for $\forall h'$, $Pr_R[out(P; x, R, h(x))=1] \leq \delta$.

The term err(P) is defined to be the minimum $\delta$ such that the above conditions are satisfied. The term help cost hcost(P) is defined as the maximum length of h, over all x, and the verification cost vcost(P) is defined to be the maximum number of bits communicated by Players 1 through t over all x and R. Finally, the cost of P, denoted cost(P), is defined as hcost(P)+vcost(P). The $\delta$-error MA-complexity of $f$ is then defined as $MA_\delta(f)=\min\{cost(P):P$ is an MA protocol for $f$ with err $(P) \leq \delta\}$. Further, MA($f$) is defined as $MA_{1/3}(f)$.

A variant of the above model is used for online-MA communication, which is specific to one-way protocols (that is, protocols where the players speak once each, in increasing order), and where Merlin constructs t help messages $h_1, \ldots h_t$ so that the ith message is only a function of the first i inputs. To make this precise, the definition of δ-error needs to be modified such that an online-MA protocol is δ-error if there exists a family of functions $h_i:X_1^* \ldots *X_i \to \{0,1\}^*$, such that:
1. If $f(x)=1$, then $Pr_R[\text{out}(P; x, R, h(x_1), h(x_1, x_2), \ldots, h(x_1, x_2, \ldots x_t))=0] \leq \delta$, and
2. If $f(x)=0$, then for $\forall h'=(h'_1, h'_2, \ldots, h'_t)$, $Pr_R[\text{out}(P; x, R, h')=1] \leq \delta$.

The message $h_i$ is revealed privately to the ith player. The help cost, hcost(P) is defined to be the maximum length of $\Sigma_{i \in [t]} |h_i|$. The values of err(P), vcost(P), and cost(P) are the same as the conventional MA values defined above. Lastly, the parameter $MA_\delta^\to(f)$ is defined as $\min\{\text{cost}(P):P \text{ is an online MA protocol for } f \text{ with err}(P) \leq \delta\}$ and write $MA_\delta^\to(f) = MA_{1/3}^\to(f)$.

The annotated data-stream models are most conveniently defined relative to the above-described communication models. In particular, consider the computation of a function $f$ on a t-tuple $x \in U$, e.g., $\{0,1\}$ or $[n]$. The main difference between the communication model and the data stream model is that for the latter the message sent by player i must be computed with limited memory and only sequential access to $x_i$ and $h_i$. Without advice, this is equivalent to the usual definition of the single-pass data stream model. Non-Boolean functions $f$ will also be considered, as well as a sense of approximation. That is, $f$ is defined as computed correctly if the answer returned is in some pre-defined set $C(f(x))$, e.g., $\{a:|a-f(x)| \leq \varepsilon f(x)\}$.

For the data stream model, the help h provided by Merlin is decomposed into t (deterministic) functions that map the input to binary help strings: $h_1:U^1 \to \{0,1\}^*, \ldots, h_t:U^t \to \{0,1\}^*$. Let $h(x):=(h_1(x), \ldots, h_t(x))$. A randomized protocol, denoted A, is then considered with oracle access to a random string R, where Player i computes a message of size at most w given only w bits of working memory and only sequential access to the bit stream $\langle x_i, h_i(x) \rangle$. The output of this protocol is allowed to include the special symbol ⊥ if the verifier is not convinced of the validity of the annotation. Such a protocol is said to be δ-error if $Pr_R[\text{out}(A; x, R, h) \notin C(f(x))] \leq \delta$ and $Pr_R[\text{out}(A; x, R, h') \neq \bot] \leq \delta$ for any $h'=(h'_1, h'_2, \ldots h'_t) \neq h(x)$. The function err(A) is defined to be the minimum δ such that the above conditions are satisfied. The help cost hcost(A) is defined to be maximum length of $\Sigma_i|h_i|$, over all x, and the verification cost vcost(A)=w. It is then concluded that A and h forms an (h,v) scheme if hcost(A)=O(h+1), vcost(A)=O(v+1) and err(A)=⅓.

The protocols make substantial use of fingerprinting techniques, enabling a verifier to test whether two large streams represent the same object using small space. Let $Z_+$ denote the set of non-negative integers and $F_q$ denote the finite field with q elements (whenever it exists). Let $A=\langle \alpha_1, \alpha_2, \ldots \alpha_m \rangle$ denote a data stream, with each $\alpha_i \in [n]$. Then, A implicitly defines a frequency distribution $f(A):=(f_1, f_2, \ldots f_n)$, where $f_j=|\{I \in [m]: \alpha_i=j\}|$. Fingerprints are formed by computation over this field, as:

Basic Fingerprint Definition. Let $f=(f_1, \ldots, f_n) \in Z_+^n$ be a vector and let q be a prime. Then the basic fingerprint off based on q is defined to be $BF_q(r, f):=\Pi_{j=1}^n (r-j)^{f_j}$; where $r \in F_q$. To make fingerprints, an a priori bound on $\|f\|_1=m$ is needed, where q is chosen based on the following analysis, where q≥m is a prime, and choose r uniformly at random from $F_q$. Given an input stream α of length m, the fingerprint $BF_q(r, f(A))$ can be computed using O(log q) storage. Suppose $f' \in Z_+^n$ is a vector with $f' \neq \|f'\|_1 \leq m$. Then the "collision probability" can be defined as follows:

$$Pr[BF_q(r,f')=BF_q(r,f(A))] \leq m/q.$$

An online scheme for the "selection" problem will now be described. Given the desired rank $k \in [m]$, the goal is to output an item $\alpha_k$ from the stream $A=\langle \alpha_1, \ldots, \alpha_m \rangle$, such that $|\{i:\alpha_i<\alpha_k\}|<k$ and $|\{i:\alpha_i>\alpha_k\}| \leq m-k$. An easy (log n, log mn) prescient scheme is for the helper to supply an answer s as annotation at the start of the stream. The verifier need only count the number of items in the stream that are: 1) smaller than s and 2) greater than s. The verifier returns s if the rank of s satisfies the necessary conditions. In what follows, a method for providing online annotation to solve this selection problem is presented. Indeed, mathematical analysis of this problem has shown that it is not possible to improve on the costs of this solution.

First, consider the online MA complexity of the communication problem of INDEX: Alice holds a string $x \in \{0,1\}^N$, Bob holds an integer $l \in [N]$, and the goal is for Bob to output INDEX(x, i):=$x_i$. Let h and v be integers such that hv≥N. There is an online MA protocol P for INDEX, with hcost(P)≤h and vcost(P)=O(v log h); and any online MA protocol Q for INDEX must have hcost(Q) vcost(Q)=Ω(N). So, in particular, $MA^\to(\text{INDEX})=\Theta(\sqrt{N})$.

The protocol is as follows: write Alice's input string x as follows: $x=y^{(1)} \ldots y^{(v)}$, where each $y^{(j)}$ is a string of at most h bits, and fix a prime q with 3h<q<6h. Let $y^{(k)}$ be the substring that contains the desired bit $x_i$. Merlin sends Bob a string z of length at most h, claiming that it equals $y^{(k)}$. Alice picks a random $r \in F_q$ and sends Bob r and the strings $BF_q(r, y^{(1)}), \ldots, BF_q(r, y^{(v)})$, thus communicating O(v log h) bits. Bob checks if $BF_q(r, z)=BF_q(r, y^{(k)})$, outputting 0 if not. If the check passes, Bob assumes that $z=y^{(k)}$, and outputs $x_i$ from z under this assumption. The error probability is at most h/q≤⅓.

In this exemplary implementation (denoted as "index verification protocol"), the processes identified in FIG. 1 can be further defined as follows:
Verifier protocol of step 40 includes the following:
  Select a "help message" length h and a verifier bit length v such that h*v>n
  Initialize v hash values; and
  For each bit in the input, identify the block to which it belongs and update the hash value of that block with the new bit
Helper protocol of step 50 includes the following:
  Identify block containing the bit of interest; and
  Output block of h bits containing the bit of interest
Verification test of step 60 includes the following:
  Compute the hash of block of bits given by help 30, then
  Does computed hash match stored hash for this block? If "yes", then output the relevant bit of the block, otherwise if
  "no", then output a "fail" message For any h,v s.t. hv≥m, there is an (h log m log n, v log m) online scheme for SELECTION and any (h, v) online scheme for SELECTION must have hv=Ω(m). That is, conceptually, the verifier builds a vector $r=(r_1, \ldots, r_n) \in Z_+^n$ where $r_k=|\{j \in [m]:\alpha_j<k\}|$. This is done by inducing a new stream A' from the input stream A: each token $\alpha_j$ in A causes virtual tokens $\alpha_j+1, \alpha_j+2, \ldots, n$ to be inserted into A'. Then, r=f(A'); note that $\|r\|_1=O(m^2)$. As in the INDEX protocol, the vector r is arranged into v subvectors of dimension h, and the verifier retains only fingerprints—based on a prime $q=O(m^2)$—on each subvector. After the stream is seen, the helper claims that the answer is s, by providing the values of $r_i$ for all i in the subvector containing s. The verifier fingerprints the provided block, and outputs s if it agrees with their stored fingerprint, otherwise it returns "fail".

It is noted that in the above scheme, the information computed by the verifier is independent of k, the rank of the desired element. Therefore, these algorithms work even when k is revealed at the end of the stream.

Next, the properties of $f=\{f_i : I \in [n]\}$, where $f_i$ is the frequency of the token "i" in the stream, is considered. In particular, the kth frequency moment is defined as $F_k = \Sigma_{i \in [n]} f_i^k$ and the frequent items are defined as the set $\{i : f_i > T\}$, for some threshold T. It is well known that in the traditional data stream model, exact computations of $F_k (k \neq 1)$ requires $\Omega(n)$ space. Even constant approximation requires $\Omega(n^{1-2/k})$ space.

The algorithms are first presented for exact and approximate frequent items. The approximate result relies on a powerful way that annotations can be used in conjunction with sketch based algorithms, and it is expected that other applications will be found. Matching upper and lower bounds are then presented for computing $F_k$.

A prescient helper can list the set of claimed frequent items, along with their frequencies, for the verifier to check against the stream. It must also be ensured, however, that the helper is not able to omit any items that exceed the threshold. A compact witness set is first shown for the problem that leads to schemes for the exact case, then an adaptation to provide an online scheme is given for an approximate relaxation of the frequent items problem.

There exists a $(\phi^{-1} \log^2 m, \phi^{-1} \log^2 m)$ prescient scheme and a $(\phi^{-1} n^\alpha \log m, n^{1-\alpha} \log m)$ online scheme ($\alpha \in [0,1]$) for finding $\{i : f_i \geq T := \phi m\}$. Any (h, v) online scheme for this must have $hv = \Omega(n)$. In particular, consider a binary tree whose leaves are the elements of the universe [n]. Associate each node v with the set of elements at the leaves of the subtree rooted at v. Call this set S(v), where S(u)={i} if u is the ith leaf. Let $g(v) = \Sigma_{i \in S(v)} f_i$. It is to be noted that if u is a node and v is any ancestor of u, then $g(u) \leq g(v)$. Now observe that there is a witness set of size $O(\phi^{-1} \log n)$ to identify all leaves i with $f_i > T$: this consists of the set W of all such i's in addition to pairs of nodes (u,v) such that u is the child of v, and $g(u) \leq T$ but $g(v) > T$. Here, each pair $(u,v) \in W$ is witness to the fact that no leaves $i \in S(u)$ can have $f_i > T$. These values of $S(u) \cup \{i : f_i \geq T\}$ form a partition of [n]. Further, there can be at most $\phi^{-1}$ such nodes v at any level of the binary tree, since the sum of g(v) is at most in. This bounds the size of this witness set to $|W| = O(\phi^{-1} \log n)$.

This leads to two schemes for the problem. In the first, a prescient scheme, the helper lists the members of W and their corresponding frequencies. The verifier remembers this information, and ensures that it agrees with the frequencies in the stream. Assuming $m = \Omega(n)$, then $hcost = vcost = \phi^{-1} \log^2 m$. In the second, an online scheme, the 2n−1 nodes in the tree are divided into v groups of h such that hv2n. The verifier keeps a fingerprint of the frequency vector of each group. After the stream is seen, the helper provides the witness set W, sorted by the natural order on nodes, along with the frequency vector of all groups containing items named in W. This totals min $\{O(|W|h), n\}$ items, resulting in a $(\min\{n \log m, h\phi^{-1} \log m\}, v \log m)$ online scheme. A subtlety here is that the output size can exceed the verifier's memory, so the verifier may output a partial result before returning "fail".

In many cases, it suffices to find a set of approximate frequent items; these include all items with $f_i > \phi m$ and no items with $f_i < (\phi - \in)m$ for parameters $\in, \phi$. Solutions to this problem in the traditional streaming model are often based on "sketch" algorithms. In accordance with the present invention, an "integer linear sketch" is defined as any summary v that can be computed as $v = Sf(A)$ for a "sketch matrix" S with integral entries. Such sketches include the Count Sketch (described in "Finding Frequent Items in Data Streams", M. Charikar et al., *Proceedings of International colloquium on Automata, Languages and Programming*, 2002) and the Count-Min Sketch (described in "An improved Data Stream Summary: The Count min sketch and its application" G. Cormode et al., *Journal of Algorithms*, Vol. 55, Issue 1, April 2005). Each stream token i increments v by $Se_i$, where $e_i$ is the vector that is 1 in location i and 0 elsewhere. The sketch can be fingerprinted: each update multiplies the fingerprint by $BF_q(r, Se_i)$. This observation means that the helper can annotate (parts of) v at the end of the stream, for verification. However, to define an efficient scheme, the following also needs to be shown: (1) the verifier can compute $Se_i$ in small space, so S must have a compact representation; and (2) the verifier must be able to extract the result from v in a streaming fashion, in space sublinear in the size of the sketch.

In further accordance with the present invention, concepts from verifying exact frequent items are used to build a scheme for verifying approximate frequent items via sketching. The sketch vector is defined by $v_{l,j} = \Sigma_{i:b_l(i)=j} f_i c_l(i)$ and the basic estimate of the frequency of i is $\hat{f}_{i,l} = c_l(i) v_{l, b_l(i)}$. This satisfies $|\hat{f}_{i,l} - f_i| = O((F_2/w)^{1/2})$ with constant probability; to reduce the error probability, the median of the basic estimates from d basic sketches with different hash functions are taken, $\hat{f}_i = \text{median}_{1 \leq l \leq d} \hat{f}_{i,l}$.

There also exists an (s log n log m, log in) online scheme to verify the approximate frequent items found by Count-Sketch or Count-Min sketches of size s. Given a threshold T, the set of approximate frequent items are $\{i : \hat{f}_i > T\}$. To ensure that no items are omitted, the witness-tree approach from above is used, with a consideration of an expanded set of items that include the set of tree nodes v and their corresponding frequencies $f(v)$: the helper and verifier now keep a sketch $v^k$ for each level k of the tree. Although the above analysis is stated in terms of exact frequencies, the same argument holds when $\hat{f}_i = f_i \pm \in m$. In particular, when using sketches with $d = O(\log n)$, this holds for each i with probability at least $(1 - \frac{1}{16n})$, and so it holds over all 2n frequencies with probability at least $\frac{7}{8}$. Therefore, with this large constant probability and $\in < \phi/2$, there is a valid witness set W of $O(\log n/\phi)$ tree nodes.

The verifier can validate this witness set W using the above method over the full set of nodes and their estimated frequencies. By presenting the set of nodes v in W in order of minS (v), the verifier can ensure that the nodes identified do form a partition of [n] as required (and, therefore, no high frequency items are omitted). If the helper provides for each node $v \in W$ the information $(v, \hat{f}_v, \hat{f}_{v,1}, \ldots, \hat{f}_{v,d})$, where $\hat{f}_{v,i}$ is the $i^{th}$ of d estimates obtained from the sketch which relate to the frequency of node v, the verifier can check that $\hat{f}_x$ is above or below T as appropriate. The verifier ensures that $\hat{f}_v$ is derived correctly from the d values of $\hat{f}_{v,L}$ (using O(d) working space). The verifier also incrementally builds a fingerprint of the set $B = \{(v, L, \hat{f}_{v,L})\}$. At the end of the annotation, the helper lists the entries of each sketch $v_{i,j}^k$ in order and tags each entry with the set of v's for which it has been used to make an estimate. The verifier builds a fingerprint of the tuples $(v, L, c_L(v) v_{i,j}^k)$, and checks that it matches the fingerprint of B. The verifier also fingerprints the (tagged) sketch to check that it matches the verifier's fingerprinted sketch built from the input stream.

The total amount of annotation is O(s log n) sketch entries, from the log n sketches of size s. The verifier needs to remember d estimated frequencies (to verify their median) and O(Log n) fingerprinted sketches (one for each level). It is to be noted that if $\phi \gg \in$, then the verifier only needs to inspect a small fraction of the sketch entries to verify the frequent items. In this case, a tradeoff is obtained: the sketch is written as an array of h×v entries, so that $hv \geq s$. The verifier can create v fingerprints, each summarizing h entries of the sketch. To verify, the helper modifies the above algorithm to only present those blocks of h entries which include a value that needs to be seen by the verifier. In total, to verify O(|W|) approximate frequencies requires verifying O($\phi^{-1}$d log n) entries, giving an ($\phi^{-1}$ h log m log$^2$ n, v log m) online scheme.

There are other algorithms that find all items i such that $\hat{f}_i \geq \phi F_2^{1/2}$. These can also be adapted to the setting of the present invention by using similar ideas, and verified in logarithmic space with annotation proportional to the sketch size.

Suppose h and v are positive integers with hv≥n. Then, for integers k≥1, there exists a (k$^2$h log m, kv log m) online scheme for computing $F_k$ exactly. In particular, let A be defined as the input stream. The length n vector $f(A)$ is mapped into an h×v matrix $(f(x,y))_{x \in [h], y \in [v]}$, using any canonical injection between [n] and [h]×[v]. Next, a prime q is selected, where q≥max $\{m^k, 3\,kh\}$; since m≥n, this can be done while ensuring that log q=O(k log m). It is presumed that the work will proceed in the field $F_q$, which is safe since q exceeds the maximum possible value of $F_k(A)$. Let $\hat{f}(X, Y) \in F_Q\{X, Y\}$, be the unique polynomial satisfying $\deg_x(\hat{f})$=h−1, $\deg_y(\hat{f})$=v−1 and $\hat{f}(x,y)=f(x,y)$ for all (x,y) $\in$ [h]×[v]. The verifier picks a random r $\in F_q$. As the stream is read, the verifier maintains a sketch consisting of the v quantities $\hat{f}(r, 1), \ldots, \hat{f}(r, v)$. Clearly, this sketch fits in O(v log q) bits of storage.

At the end of the stream, the annotator provides a polynomial s'(X) $\in F_q[X]$ that is claimed to be equal to s(X):=$\Sigma_{y \in [v]} \hat{f}(X, y)^k$, which has degree at most k(h−1), thus using O(kh log q) bits of annotation. The verifier evaluates s'(r) from the supplied annotation and computes s(r)=$\Sigma_{y \in [v]} \hat{f}(r,y)^k$ from his sketch, checks that s'(r)=s(r) and outputs ⊥ if not. If the check passes, the verifier outputs $\Sigma_{x \in [h]}$s'(x) as the final answer. Clearly, this answer is correct if the annotation was honest. Further, the verifier is fooled only if s'≠s, but s'(r)=s(r); the probability of this is at most k(h−1)/q≤⅓, by the given choice of q.

It remains to be shown that the sketch can be computed incrementally in O(v log q) space. To maintain each $\hat{f}(r,y)$ for y $\in$ [v], it is noted that upon reading a new token I $\in$ [n] that maps to (a,b) $\in$ [h]×[v], the necessary update is of the form:

$$\hat{f}(r,y) \leftarrow \hat{f}(r,y) + p_{a,b}(r,y) \text{ where}$$

$$p_{a,b}(X,Y) = \Pi_{i \in [h] \setminus \{a\}}(X-i)(a-i)^{-1} \cdot \Pi_{j \in [v] \setminus \{b\}}(Y-j)(b-j)^{-1}.$$

Since $p_{a,b}(r,y)$=0 for any y $\in$ [v]\{b}, the verifier need only update the single value $\hat{f}(r,b)$, by adding $p_{a,b}(r,y)$, upon reading this token. It is to be noted that using a table of O(v) appropriate precomputed values, this update can be efficiently computed. For h=v=$\sqrt{n}$, this takes a constant number of arithmetic operations per update. There is little room for improvement in the costs of this protocol, since any (h, v) scheme that exactly computes $F_k$ requires hv=$\Omega(n^{1-5/k})$.

In an exemplary implementation of the system of FIG. 1 (denoted as the "frequency moment protocol"), the process identified in FIG. 1 can be further defined as follows:

Verifier protocol of step 40 includes the following:
Select a "help message" length h and a verifier bit length v such that h*v>n
Select a random value "r",
Initialize $f(r,j)$=0 for all j=1 to v;
Then, for each update,
Interpret update location as a coordinate (a,b)
Update the relation $f(r,j)$ for all j=1 to v, using the relation $f(r,j) \leftarrow f(r,i) + p_{a,b}(r,i)$, where $p_{a,b}(x,Y)$ is defined as:

$$\Pi_{i \in [h] \setminus \{a\}}(X-i)(a-i)^{-1} \cdot \Pi_{j \in [v] \setminus \{b\}}(Y-j)(b-j)^{-1}.$$

Helper protocol of step 50 includes the following:
Compute and output s(x)=$\Sigma_{j \in [v]} f(x,j)^k$.
Verification test of step 60 includes the following:
Compute s(r) and check if s(r)=$\Sigma_{j \in [v]} f(r,j)^k$.
Then, if "yes", output $F_k = \Sigma_{i \in [h]}$s(i), otherwise
Output "fail"

For graphs defined by streams of m edges on n nodes, it is now shown that only O(log n) space is needed by the verifier to determine whether a graph is connected, contains a perfect matching, or is triangle-free, with annotation proportional to the input size. Tighter results are also presented for testing connectivity of sparse graphs, determining of a bipartite graph has a perfect matching, and counting triangles.

Estimating the number of triangles in a graph has received significant attention because of its relevance to database query planning (i.e., knowing the degree of transitivity of a relation is useful when evaluating relational queries) and investigating structure properties of a web-graph. In the absence of annotation, any single pass algorithm to determine if there is a non-zero number of triangles requires $\Omega(n^2)$ bits of space. It can be shown that the answer can be verified with $O(n^2)$ notation in logarithmic space. This is the best possible outcome, since any (h, v) scheme for counting triangles must have hv=$\Omega(n^2)$.

An online scheme is now outlined with vcost=O(log n) and host=$O(n^2)$. A major subroutine of the algorithm is the verification of matrix multiplication in the model. That is, given n x n matrices A, B, and C, verify that AB=C. The inventive technique extends prior art results by showing that if the helper presents the results in an appropriate order, the verifier needs only O(log n) bits to check the claim. It is to be noted that this much annotation is necessary if the helper is to provide C in his stream.

There also exists a ($n^2$, log n) online scheme for matrix multiplication. It is known that the verifier can check AB=C by picking r uniformly from $F_q$ and checking that $A(Br^T)=Cr^T$ for vector $r=(r^1, \ldots, r^n)$. This fails to distinguish different matrices with probability at most n/q. Rather than computing $A(Br^T)$ and $Cr^T$ explicitly, the verifier will compare fingerprints of $Cr^T$ and $A(Br^T)$. These are computed as $sCr^T$ and $sA(Br^T)$, for a vector $s=(s^1, \ldots s^n)$ where s is picked uniformly from $F_q$. This also fails with probability at most n/q. The following points are observed:

1. s $Cr^T = \Sigma_{i,j} s^i r^j C_{i,j}$ can be computed easily regardless of the order of the entries in C,
2. $sA(Br^T) = (sA)(Br^T)$ is the inner product of two n-dimensional vectors, where $(sA)_i = \Sigma_j s^j A_{i,j}$ and $(Br^T)_i = \Sigma_j r^j B_{i,j}$ Therefore, if the helper presents the ith column of A followed by the ith row of B for each i in turn, the verifier can easily compute $sA(Br^T)$, in O(log q) space. Picking q≥6n ensures that the verifier is fooled with probability at most ⅓, and the total space used by the verifier to store r, s and intermediate values is O(log n).

With this primitive, the arbitrary matrix products $A_L A_{L-1} \ldots A_2 A_1$ are verified with $O(\ln^2)$ annotation by verifying $A_{2,1} := A_2 A_1$, then $A_{3,2,1} := A_3 A_{2,1}$, etc. Matrix powers $A^L$ are verified with $O(n^1 \log L)$ annotation.

Following, there is also a ($n^2$, log n) online scheme for counting triangles. Specifically, denote the graph adjacency matrix by A, with $A_{i,i}:=0$. The helper lists $A_{v,w}$ and $A_{v,w}^2$ for all pairs (v,w) in some canonical order. The verifier computes $\Sigma_{v,w} A_{v,w} A_{v,w}^2$ as the number of triangles. The verifier uses fingerprints to check that A matches the original set of edges, and the protocol in the above theorems to ensure that $A^2$ is as claimed.

There is a ($n^{3\alpha}, n^{3-3\alpha}$) online scheme for counting triangles ($\alpha$ Å [0,1]). In particular, an online scheme for testing whether a bipartite graph has a perfect matching is now presented. Graph matchings have been considered in the stream model and it can be shown that any single pass algorithm for determining the exact size of the maximum matching requires $\Omega(n^2)$ space. It can be shown that this computation can be off-loaded to the helper such that, with only $O(n^2)$ annotation, the answer can be verified in $O(\log n)$ space.

There exists a $(m, \log n)$ online scheme for bipartite perfect matching and any $(h, v)$ scheme for bipartite perfect matching requires $hv=\Omega(n^2)$ space. In the general case, there may be nodes in $[n]$ with no incident edges, which are to be ignored for matching. If there is a perfect matching M, the annotation lists all edges in M, and the degree of all nodes in $[n]$. Let x he the characteristic vector that has 1 in the with coordinate if and only if the degree of v is non-zero, y be the vector of node frequencies in M. The verifier can use fingerprints to ensure that the claimed degree sequence is correct, and that x matches y. If the graph does not have a perfect matching, Hall's theorem proves a witness. Let $L \cup R$ be a bipartition of the graph, then there exists $L' \subset L$ such that $|L'|>|\Gamma(L')|$, the neighbors of L'. The helper lists for each node: its degree; whether it is in L or R; and whether it is in L', $\Gamma(L')$, or neither. Then the helper presents each edge $(u, v)$, along with the same information on each node. The verifier can ensure that the sets are consistent with a constant number of fingerprints. It remains to check that each edge is allowable and $|L'|>|\Gamma(L')|$.

The problem of determining if a graph is connected has been considered in the standard stream model, as well as the multi-pass W-stream model. In both models, it can be shown that any constant pass algorithm without annotations needs $\Omega(n)$ bits of space. In the model of the present invention, the helper can convince a verifier with $O(\log n)$ space whether a graph is connected with only $O(m)$ annotation. This is the best possible for sparse graphs where $m=O(n)$.

There exists a $(m, \log n)$ online scheme for connectivity and any $(h, v)$ online scheme for connectivity requires $hv=\Omega(n)$, even when $m=O(n)$. If the graph is connected, then there exists a spanning tree T directed towards the root and an injective labeling of the nodes $f:V\to[|V|]$ such that each non-root node with label j is linked to exactly one node with label $>j$. The helper outputs such a function $f$, and the verifier ensures that it is an injection. Then, each (directed) edge $(u, v)$ in T and its labels $f(u)>f(v)$ is presented in decreasing order of $f(u)$. The verifier checks this order, and ensures that it is consistent with $f$ via fingerprinting. The helper must also list all edges, so that the verifier can ensure that all T edges are from the input.

If the graph is not connected, the annotation presents a bipartition of the graph. Each node is presented along with its label, and each is presented along with the corresponding node labels. The verifier uses fingerprinting to ensure no edge is omitted, and the multiset protocol of the above lemma to ensure that the node labels are consistent.

It will be apparent to those skilled in the art that various modifications may be made in the present invention, without departing from the spirit or scope thereof. Thus, it is intended that the present invention cover the modifications and variations of this invention provided they come within the scope of the appended claims and their equivalents.

What is claimed is:

1. A method for verifying third party annotation of data stream processing, the method comprising:
   receiving a data stream at a computer;
   outsourcing the data stream to a third party computer to perform a computation by a third party;
   receiving a result of the computation from the third party computer;
   receiving an annotated version of the data stream from the third party computer;
   defining a help cost H from the annotated version of the data stream;
   defining a number V of bits in memory; and
   multiplying the help cost H by the number V of bits to verify the result of the data stream.

2. The method as defined in claim 1, further comprising selecting h bits from the annotated version of the data stream.

3. The method as defined in claim 2, further comprising selecting v bits from the number V of bits in the memory.

4. The method as defined in claim 3, further comprising multiplying the h bits by the v bits.

5. The method as defined in claim 4, further comprising performing a hash of h multiplied with v.

6. The method of claim 1, further comprising failing the result of the data stream.

7. A computer-readable memory storing instructions that when executed by a processor cause the processor to perform operations, the operations comprising:
   receiving a data stream;
   outsourcing the data stream to a third party computer to perform a computation by a third party;
   receiving a result of the computation from the third party computer;
   receiving an annotated version of the data stream from the third party computer;
   defining a help cost H from the annotated version of the data stream;
   defining a number V of bits in memory; and
   multiplying the help cost H by the number V of bits to verify the result of the data stream.

8. The computer-readable memory of claim 7, wherein the operations further comprise selecting h bits from the annotated version of the data stream.

9. The computer-readable memory of claim 8, wherein the operations further comprise selecting v bits from the number V of bits in the memory.

10. The computer-readable memory according to claim 7, wherein the operations further comprise multiplying the h bits by the v bits.

11. The computer-readable memory according to claim 10, wherein the operations further comprise performing a hash of h multiplied with v.

12. The computer-readable memory according to claim 7, wherein the operations further comprise failing the result of the data stream.

13. A system, comprising:
   a processor; and
   memory storing code that when executed causes the processor to perform operations, the operations comprising:
   receiving a data stream;
   outsourcing the data stream to a third party computer to perform a computation by a third party;
   receiving a result of the computation from the third party computer;
   receiving an annotated version of the data stream from the third party computer;
   defining a help cost H from the annotated version of the data stream;
   defining a number V of bits in memory; and
   multiplying the help cost H by the number V of bits to verify the result of the data stream.

14. The system according to claim 13, wherein the operations further comprise selecting h bits from the annotated version of the data stream.

15. The system according to claim 14, wherein the operations further comprise selecting v bits from the number V of bits in the memory.

16. The system according to claim 15, wherein the operations further comprise multiplying the h bits by the v bits.

17. The system according to claim 16, wherein the operations further comprise performing a hash of h multiplied with v.

18. The system according to claim 13, wherein the operations further comprise failing the result of the data stream.

* * * * *